United States Patent [19]

Kubo et al.

[11] Patent Number: 5,608,002
[45] Date of Patent: Mar. 4, 1997

[54] WATER- AND OIL-REPELLING AGENT COMPOSITION AND PROCESS FOR PREPARING THE SAME

[75] Inventors: Motonobu Kubo; Kazunori Hayashi, both of Settsu, Japan

[73] Assignee: Daikin Industries, Ltd., Osaka, Japan

[21] Appl. No.: 464,711

[22] PCT Filed: Oct. 21, 1994

[86] PCT No.: PCT/JP94/01778

§ 371 Date: Jul. 21, 1995

§ 102(e) Date: Jul. 21, 1995

[87] PCT Pub. No.: WO95/11949

PCT Pub. Date: May 4, 1995

[30] Foreign Application Priority Data

Oct. 28, 1993 [JP] Japan .................... 5-266103

[51] Int. Cl.$^6$ .............. C08K 5/02; C08F 16/24; C08F 14/18; C08F 12/20
[52] U.S. Cl. .............. 524/795; 524/462; 526/206; 526/242; 526/243; 526/245; 526/246; 526/247; 526/248; 526/250; 526/252; 526/253; 526/254; 526/255
[58] Field of Search .................. 524/795, 462; 526/206, 242, 245, 247, 248, 251, 243, 246, 250, 253, 254

[56] References Cited

U.S. PATENT DOCUMENTS

| | | | |
|---|---|---|---|
| 3,919,183 | 1/1975 | Jäger et al. | 526/245 |
| 5,182,342 | 1/1993 | Feiring et al. | 526/206 |
| 5,494,984 | 2/1996 | Funaki et al. | 526/255 |

FOREIGN PATENT DOCUMENTS

| | | |
|---|---|---|
| 3-17106 | 1/1991 | Japan . |
| 6-157612 | 6/1994 | Japan . |
| 6-157614 | 6/1994 | Japan . |
| 6-157616 | 6/1994 | Japan . |
| 6-157617 | 6/1994 | Japan . |
| 6-157613 | 6/1994 | Japan . |

OTHER PUBLICATIONS

International Search Report for International Appln. No. PCT/JP94/01778.

*Primary Examiner*—Peter A. Szekely
*Attorney, Agent, or Firm*—Varndell Legal Group

[57] ABSTRACT

Process for preparing a water- and oil-repelling agent composition, which is obtained by solution-polymerizing a polymerizable monomer component which contains at least a monomer having a polyfluoroalkyl group in a polymerization solvent which contains at least one compound with a boiling point of 0° to 150° C. selected from the group consisting of a hydrochlorofluorocarbon having 2 to 3 carbon atoms and a hydrofluorocarbon having 4 to 6 carbon atoms and 4 or more fluorine atoms, said solvent containing the compound in an amount of at least 5% by weight, and the water- and oil-repelling agent composition prepared thereby.

18 Claims, No Drawings

WATER- AND OIL-REPELLING AGENT COMPOSITION AND PROCESS FOR PREPARING THE SAME

TECHNICAL FIELD

The present invention relates to a fluorine-containing water- and oil-repelling agent composition and particularly relates to a solution-polymerization type water- and oil-repelling agent composition prepared by polymerizing or copolymerizing a monomer having a polyfluoroalkyl group in a specific fluorine-containing solvent, and a process for the preparation.

BACKGROUND ART

As a water- and oil-repelling agent composition to be used for dry cleaning of clothes and for water-proof spray, there has been heitherto used a solution-polymerization type water- and oil-repelling agent composition using a trichlorotrifluoroethane (CFC113) and/or 1,1,1-trichloroethane as a polymerization solvent from the viewpoint of water- and oil-repelling effect and easiness in handling thereof (JP-B-64635/1992 and JP-B-65113/1992).

However, it was recently decided in a worldwide scale to prohibit the production of such solvents as trichlorotrifluoroethane and 1,1,1-trichloroethane for the purpose of protection of the ozone layer, and it is urgently needed to find out a solvent replacing these toxic ones for the water- and oil-repelling agent composition.

As alternative solvents, hydrocarbons, perchloroethane, esters, ketones and the like have being studied (JP-A-78425/1993), and in these solvents a perfluoroalkyl group-containing monomer and a monomer free of fluorine atom are copolymerized. However, usually if a mixing ratio of the monomer having a perfluroalkyl group is increased, though water- and oil-repelling property is enhanced, there is a tendency that precipitate is formed and storage stability becomes worse. If a mixing ratio of the monomer free of fluorine atom is increased, though stability is improved, the water- and oil-repelling property tends to be worse, and it is difficult to obtain a practical composition.

The present invention was made in consideration of the above-mentioned problems, and it is an object to provide a water- and oil-repelling agent composition which is excellent in storage stability and water- and oil-repelling property, and serves to remarkably decrease or completely avoid the destruction of the ozone layer, and a process for preparation thereof.

DISCLOSURE OF THE INVENTION

The above-mentioned object can be accomplished by solution-polymerizing a polymerizable monomer component containing at least a polyfluoroalkyl group-containing monomer in a polymerization solvent containing at least 5% (% by weight, hereinafter the same) of at least one kind of compound selected from a group consisting of a hydrochlorofluorocarbon being called an alternative Freon and having 2 to 3 carbon atoms and a hydrofluorocarbon having 4 to 6 carbon atoms and 4 or more fluorine atoms.

PREFERRED EMBODIMENTS OF THE INVENTION

One of the features of the present invention is to use a specific fluorine-containing polymerization solvent.

It is preferred that the polymerization solvent to be used in the present invention has a boiling point of 0° to 150° C., especially 20° to 100° C., further especially 30° to 80° C. If the boiling point is lower than 0° C., handling of products tends to become difficult, and if it is higher than 150° C., drying of the treated article becomes slow and there is a tendency of causing problem in viewpoint of operability.

As the hydrochloroflurocarbon to be used in the present invention and having a boiling point of 0° to 150° C. and 2 to 3 carbon atoms, there are a dichlorofluoroethane such as 1,1-dichloro-1-fluoroethane (HCFC141b) (boiling point: 32° C.), a dichloropentafluoropropane such as 1,1-dichloro-2,2,3,3,3-pentafluoropropane (HCFC225ca) (boiling point: 51° C.), 1,3-dichloro-1,1,2,2,3-pentafluoropropane (HCFC225cb) (boiling point: 54° C.), and the like.

Also, as the hydrofluorocarbon having a boiling point of 0° to 150° C., 4 to 6 carbon atoms and 4 or more fluorine atoms, there are hydrofluorocarbons of a butane type, a cyclobutane type, a pentane type and a hexane type. As the butane type hydrofluorocarbon, there are a pentafluorobutane such as 1,1,1,2,2-pentafluorobutane (boiling point: 40° C.), a heptafluorobutane such as 1,1,1,2,3,3,4-heptafluorobutane (boiling point: 42° C.), 1,1,1,2,3,4,4-heptafluorobutane (boiling point 48° C.) or 1,1,2,2,3,4,4-heptafluorobutane (boiling point: 57° C.), an octafluorobutane such as 1,1,2,2,3,3,4,4-octafluorobutane (boiling point: 44° C.). As the cyclobutane type hydrofluorocarbon, there are 1,1,2,2-tetrafluorocyclobutane (boiling point 50° C.), 1,2,3,3,4,4-hexafluorocyclobutane (boiling point: 63° C.), and the like. As the pentane type hydrofluorocarbon, there are a hexafluoropentane such as 2-trifluoromethyl-1,1,1,2,4,4-hexafluoropentane (boiling point: 46° C.), an octafluoropentane such as 1,1,1,2,2,5,5,5-octafluoropentane (boiling point: 49° C.) or 2-trifluoromethyl-1,1,1,2,3,3,4,4-octafluoropentane (boiling point: 55° C.), a decafluoropentane such as 1,1,1,2,2,3,4,5,5,5-decafluoropentane (boiling point: 55° C.), and the like. As the hexane type hydrofluorocarbon, there are an octafluorohexane such as 2-trifluoromethyl-1,1,1,4,4,5,5,5,-octafluorohexane (boiling point: 57° C.), a fluorohexane such as 2-trifluoromethyl-1,1,1,2,3,4,5,5,5-nonafluorohexane (boiling point: 65° C.), a decafluorohexane such as 2-trifluoromethyl-1,1,1,3,3,4,4,5,5,5-decafluorohexane (boiling point: 62° C.), and the like. The hydrofluorocarbon having not more than 3 carbon atoms has a low boiling point, and is difficult to handle and disadvantageous in production cost.

Among them, as the hydrochlorofluorocarbon, 1,1-dichloro-1-fluoroethane is particularly preferable, and as the hydrofluorocarbon, 1,1,2,3,3,4,4-octafluorobutane, 1,2,3,3,4,4-hexafluorocyclobutane and 1,1,1,2,2,3,4,5,5,5 -decafluoropentane are particularly preferable. These may be used alone or in combination of two or more kinds thereof.

The polymerization solvent comprises at least 5%, preferably not less than 10%, more preferably not less than 20% (preferable upper limit being 100%) of at least one compound selected from the group consisting of the above-mentioned hydrochloroflurocarbon and the hydrofluorocarbon. When less than 5%, there is a tendency that the desired object to keep a better storage stability with maintaining a water- and oil-repelling property cannot be accomplished. Particularly in case where the polymerization solvent contains 1,1-dichloro-1-fluoroethane, 1,1-dichloro-1-fluoroethane is preferably contained in a ratio of at least 10%, particularly not less than 20%, more particularly not less than 25% (preferable upper limit being 100%). When less than 10%, there is a tendency that a storage stability and foaming property are lowered in case where the mixing ratio of the polyfluoroalkyl group-containing monomer is increased.

The polymerization solvent may contain a co-solvent in addition to the above-mentioned hydrochloroflurocarbon and hydrofluorocarbon.

As the co-solvent, there are used a petroleum solvent such as n-hexane, n-decane or gasoline for industrial use, a chlorine-containing solvent such as perchloroethylene or trichloroethylene, an ester such as ethyl acetate or butyl acetate, a ketone such as acetone or methyl ethyl ketone, a glycol(ether) such as ethylene glycol, propylene glycol or propylene glycol monomethyl ether, and the like.

It is preferable that the co-solvent content in the polymerization solvent is not more than 95%, particularly not more than 90%, more particularly not more than 80%. When more than 95%, there is a tendency that a necessary amount of at least one kind selected from the group consisting of the above-mentioned hydrochlorofluorocarbon and hydrofluorocarbon cannot be used and the water- and oil-repelling agent composition being excellent in water- and oil-repelling property cannot be obtained.

The monomer component to be solution-polymerized in the polymerization solvent comprises at least a polyfluoroalkyl group-containing monomer.

As the polyfluoroalkyl group-containing monomer, there is a polyfluoroalkyl group-containing (meth)acrylic acid ester represented by

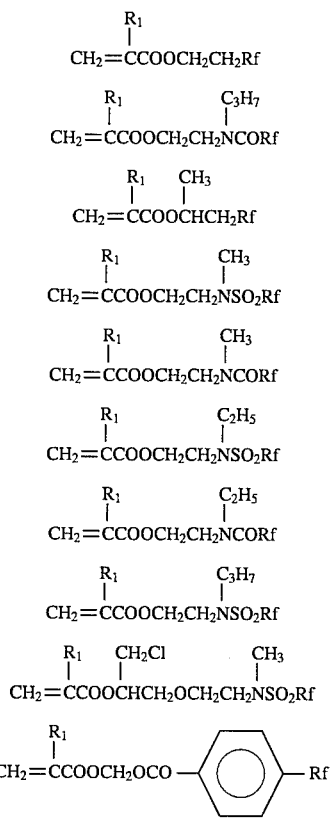

($R_1$ is H or $CH_3$, Rf is defined hereinafter). Examples are, for instance, perfluorooctylethyl acrylate, 2-perfluorooctyl-1-methylethyl acrylate, 2-(N-ethylperfluorooctasulfoamide)ethyl acrylate and the like. Also, as a suitable monomer, there is a vinyl compound represented by

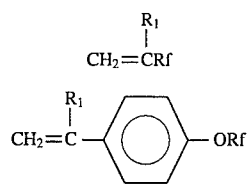

($R_1$ is as defined above, Rf is defined hereinafter). Examples are perfluorooctylethylene, perfluorooctyloxyphenylethylene and the like. It is possible to use in combination of two or more kinds thereof.

The above-mentioned Rf is a linear or branched polyfluoroalkyl group having 3 to 21 carbon atoms, preferably 4 to 16 carbon atoms. Usually a group having a perfluoroalkyl group at its end is selected, but a group having hydrogen atom or chlorine atom or a group containing oxypolyfluoroalkylene may be employed.

As the monomer component, there may be used a monomer free of a polyfluoroalkyl group in addition to the above-mentioned polyfluoroalkyl group-containing monomer. It is preferable that a weight ratio of the polyfluoroalkyl group-containing monomer to the monomer free of polyfluoroalkyl group is 20/80 to 100/0, particularly 30/70 to 100/0. If this weight ratio is less than 20/80, there is a tendency that a better water-repelling property cannot be obtained.

As the monomer free of polyfluoroalkyl group, there may be used a compound having a radical reactive unsaturated bond, for example, a methacrylic acid and an acrylic acid or an ester thereof represented by

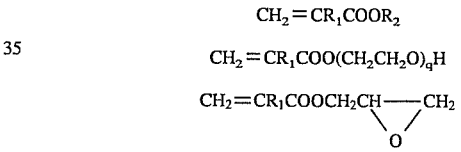

$$CH_2 = CR_1COO(CH_2CH_2O)_qCOCR_1 = CH_2$$

($R_1$ is as defined above, $R_2$ is H or $C_pH_{2p+1}$ (p is an integer of 1 to 23), q is an integer of 1 to 30), for example, stearyl (meth)acrylate, 2-ethylhexyl (meth)acrylate, lauryl acrylate, polyethylene glycol mono (meth)acrylate, glycidyl (meth)acrylate, polyethylene glycol di(meth)acrylate, and the like. Also there may be used monomers represented by

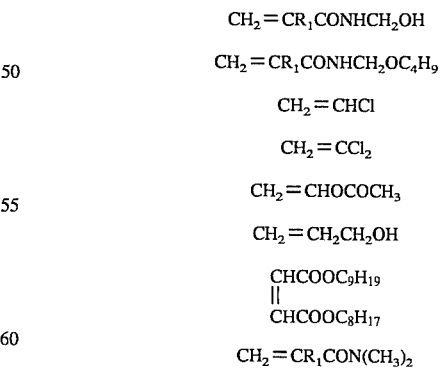

($R_1$ is as defined above), for example, ethylene, vinyl alkyl ether, maleic acid anhydride, styrene, α-methylstyrene, p-methylstyrene, acrylonitrile, butadiene, isoprene, chloroprene, methyl vinyl ketone and the like, in addition to a (meth)acrylic amide derivative, a halogen-containing vinyl monomer such as vinyl chloride or vinylidene chloride, vinyl acetate, maleic acid dialkyl ester, vinyl alcohol, and the like.

It is preferable that an amount of the monomer component is 0.5 to 50%, particularly 1.0 to 50%, more particularly 5 to 45% on the basis of a total weight of the monomer component and the polymerization solvent. When less than 0.5%, there is a tendency that, a yield of polymer per unit polymerization lowers, resulting in an economical disadvantage. When more than 50%, there is a tendency that gelation of a polymerization system are liable to occur and the reaction becomes difficult to continue.

The solution is polymerization is preferably conducted in a pressure resistive reaction vessel like an autoclave, if necessary, at a temperature of 20° to 200° C., particularly 30° to 150° C., more particularly 40° to 130° C. usually by adding a polymerization initiator. When the polymerization temperature becomes lower than 20° C., the unreacted monomer tends to remain. When it becomes higher than 200° C., the inner pressure of the autoclave rises too high and the production tends to become difficult from a mechanical viewpoint. The reaction time depends on the reaction temperature, and is usually from about 1 to hours, preferably about 2 to about 15 hours, more preferably about 3 to about 10 hours.

As the polymerization initiator, there is used an organic peroxide, an azo compound including an azobis compound, a persulfate and the like, and may be employed an ionizing radiation such as γ rays.

For example, when a vinyl compound is used as the monomer component, the solution polymerization can be conducted by a known method applicable to polymerization of vinyl compounds. The polymerization can be carried out in a vessel equipped with an stirrer and means for external heating or cooling. More particularly, the polymerization is carried out, for example, in the following manner. First, the monomer component is added to the polymerization solvent, and the polymerization is conducted in the presence of the polymerization initiator with the content of the monomer components being from 0.5 to 50% on the basis of the total weight of the monomer component and the polymerization solvent, and the temperature of the solution comprising the monomer component and the polymerization solvent being from 40° to 150° C. The polymerization initiator, when the vinyl compound is used as the monomer component, may be any of known chemicals for initiating solution polymerization of an unsaturated vinyl compound. Usually an azo compound and a peroxide soluble in the solvent are used. As the peroxide, there are an acyl peroxide such as benzoyl peroxide or lauroyl peroxide, an organic perester such as t-butyl perbenzoate and a dialkyl peroxide such as di-t-butyl peroxide. As the azo compound, there are azobis (isobutylonitril) and azobis (2,4-dimethylnitrile), and the like. An amount of the polymerization initiator is usually 0.1 to 2% on the basis of the weight of the monomer component.

There is a case where a molecular weight of the polymer can be controlled by the polymerization initiator alone or by the other conditions. When the control is insufficient only with them, a small amount of a chain transfer agent such as an alkane (C1 to C12) thiol may be added.

It is preferable that a number-average molecular weight of the obtained polymer is from 1,000 to 100,000, particularly from 5,000 to 70,000, more particularly from 10,000 to 50,000. When the molecular weight is lower than 1,000, water- and oil-repelling property tends to be lowered, and when higher than 100,000, whitening and powdering tend to occur.

After the polymerization of the monomer component, there may be optionally added a solvent other than the above-mentioned hydrochlorofluorocarbon and hydrofluorocarbon, if necessary, in the water- and oil-repelling agent composition of the present invention. It is one of the features of the present invention that there occurs no problem with a water- and oil-repelling property, dissolution stability, low temperature storage stablity and the like, even if another solvent is added in the manner mentioned above after the completion of the polymerization.

Despite that the solvent such as trichlorotrifluoroethane or 1,1,1-trichloroethane is not used as the polymerization solvent for the water- and oil-repelling agent composition of the present invention, an excellent water- and oil-repelling property can be obtained without forming sediments and lowering a storage property, even when the mixing ratio of the polyfluoroalkyl group-containing monomer is increased.

Thus the water- and oil-repelling agent composition of the present invention comprises the polmerization product of the monomer component containing the above-mentioned polyfluoroalkyl group-containing monomer, and the above-mentioned polymerization solvent, if necessary, another solvent, and an antistatic agent and a mildew proof agent as occasion demands.

In addition, there is one feature of the present invention such that when the composition is applied to a dry cleaning machine, there occurs only little foaming of a dry cleaning solvent and thus reducing troubles caused from foaming.

The water- and oil-repelling agent composition of the present invention can be applied to a water- and oil-repelling agent for wood, metal and plastic surface, a mold releasing agent, a liquid resin antisticking agent for condensor lead wires and the like in addition to the use for dry cleaning.

The water- and oil-repelling agent composition of the present invention can be used in the form of aerosol by adding, for example, a propellant. As the propellant, there is preferably used a fluoroalkane or chlorofluoroalkane having 1 or 2 carbon atoms, LPG gas or carbon dioxide. Typical examples of the fluoroalkane or chlorofluoroalkane having 1 or 2 carbon atoms, there are dichlorotrifluoromethane, trichlorotrifluoromethane, chlorodifluoromethane, chlorodifluoroethane, dichloritrifluoroethane, tetrafluoroethane and a mixture of two or more kinds thereof. Dichlorodifluoromethane is particularly preferable. It is preferable that an amount of the propellant is from 0.05 to 2 times larger than total weight of the polymer and polymerization solvent.

The present invention is specifically explained by means of Examples, but the present invention is not limited to those Examples. In the Examples, parts means parts by weight.

EXAMPLE 1

Experimental Example 1-1

An autoclave of stainless steel with a stirrer and a heater was charged with, as the monomer component, 70 parts of perfluorooctylethyl acrylate and 30 parts of stearyl acrylate, and as the polymerization solvent, 500 arts of 1,1-dichloro-1-fluoroethane (HCFC141b), and as the polymerization initiator, 1 part of t-butyl peroxypivalate. The mixture was reacted at 70° C. for 10 hours in nitrogen atmosphere with stirring, and then the reaction was terminated by cooling to 20° C. to obtain a water- and oil-repelling agent composition.

Experimental Example 1-2

A water- and oil-repelling agent composition was prepared in the same polymerization reaction as in Experimental Example 1-1 excepting the use of 70 parts of perfluorooctylethyl acrylate and 30 parts of 2-ethylhexyl acrylate as the monomer component.

Experimental Example 1-3

A water- and oil-repelling agent composition was prepared in the same polymerization reaction as in Experimental Example 1-1 excepting the use of 70 parts of perfluorooctylethyl acrylate and 30 parts of lauryl acrylate as the monomer component.

Experimental Example 1-4

A water- and oil-repelling agent composition was prepared in the same polymerization reaction as in Experimental Example 1-1 excepting the use of 250 parts of HCFC141b and 250 parts of n-decane as the polymerization solvent.

Experimental Example 1-5

A water- and oil-repelling agent composition was prepared in the same polymerization reaction as in Experimental Example 1-1 excepting the use of 500 parts of 1,1-dichloro-2,2,3,3,3-pentafluoropropane as the polymerization solvent.

Experimental Example 1-6

A water- and oil-repelling agent composition was prepared in the same polymerization reaction as in Experimental Example 1-1 excepting the use of 500 parts of 1,1,2,2,3,3,4,4-octafluorobutane as the polymerization solvent.

Experimental Example 1-7

A water- and oil-repelling agent composition was prepared in the same polymerization reaction as Experimental Example 1-1 excepting the use of 500 parts of n-hexane as the polymerization solvent.

Experimental Example 1-8

A water- and oil-repelling agent composition was prepared in the same polymerization reaction as Experimental Example 1-1 excepting the use of 500 parts of n-hexane as the polymerization solvent, and 10 parts of perfluorooctylethyl acrylate and 90 parts of stearyl acrylate as the monomer component.

Experimental Example 1-9

A water- and oil-repelling agent composition was prepared in the same polymerization reaction as in Experimental Example 1-1 excepting the use of 500 parts of toluene as the polymerization solvent.

Experimental Example 1-10

A water- and oil-repelling agent composition was prepared in the same polymerization reaction as in Experimental Example 1-1 exceptling the use of 500 parts of toluene as the polymerization solvent, and 70 parts of perfluorooctylethyl acrylate and 30 parts of stearyl acrylate as the monomer component.

Experimental Example 1-11

A water- and oil-repelling agent composition was prepared in the same polymerization reaction as in Experimental Example 1-1 excepting the use of 500 parts of trichlorotrifluoroethane as the polymerization solvent.

EXAMPLE 2

Experimental Example 2-1

The water- and oil-repelling agent composition prepared in Experimental Example 1-1 was evaluated in views of the following items. The results and kind of solvent used are shown in Table 1.

[Appearance after polymerization]

Appearance at 25° C. is observed with naked eyes.

[Appearance after keeping at 0° C.]

Appearance at 0° C. is observed with naked eyes.

[Foaming property on diluting with n-decane]

The prepared water- and oil-repelling agent composition was diluted with 20 times larger amount of n-decane, and 100 ml thereof was transferred into a 500 ml graduated measuring cylinder and then sealed. A height (cm) of foam from the liquid surface formed just after sufficiently shaking was measured. The height of foam is preferably lower than 10 cm, because the resulting heights in Experimental Examples 1-7 to 1-10 are 12 to 15 cm.

[Water-repelling property]

The prepared water- and oil-repelling agent composition was diluted with a n-decane so that the solid content was 1%. After immersing a cotton fabric and a nylon fabric to the diluted solution, the cotton fabric and the nylon fabric were dried for 12 hours at room temperature. After that, evaluation was conducted according to the showering method defined in JIS-L-1092. The results are indicated as index when the state where water is completely repelled is assumed to be 100. It is preferred that the index is not less than 80.

[Oil-repelling property]

The prepared water- and oil-repelling agent composition was diluted with n-decane so that the solid content was 1%. After immersing a cotton fabric and a nylon fabric to the diluted solution, the cotton fabric and the nylon fabric were dried for 12 hours at room temperature. After that, evaluation was conducted according to the method defined in AATCC-118. The results are indicated as integer of 0 to 8 when the state where water is completely repelled is assumed to be 8. It is preferred that the result is not less than 3, particularly not less than 4.

[Molecular weight of polymer]

Number-average molecular weight of the polymer is measured by GPC (polystyrene standard).

Experimental Examples 2-2 to 2-11

The same evaluations as in Experimental Example 2-1 were carried out by using the water- and oil-repelling agent compositions prepared in Experimental Examples 1-2 to 1-11. The results and kind of polymerization solvent used are shown in Table 1.

TABLE 1

| Experimental Ex. No. | Polymerization solvent | Boiling point (°C.) | Appearance after polymerization | Appearance after keeping at 0° C. | Foaming property on diluting with n-decane (cm) | Water-repelling property C[1] | Water-repelling property N[2] | Oil-repelling property C | Oil-repelling property N | MW of polymer (Number average) |
|---|---|---|---|---|---|---|---|---|---|---|
| 2-1 | Dichlorofluoroethane | 32 | Homogeneous and clear | Homogeneous and clear | 2 | 100 | 100 | 6 | 6 | 26000 |
| 2-2 | Dichlorofluoroethane | 32 | Homogeneous and clear | Homogeneous and clear | 2 | 100 | 100 | 6 | 6 | 30000 |
| 2-3 | Dichlorofluoroethane | 32 | Homogeneous and clear | Homogeneous and clear | 2 | 100 | 100 | 5 | 5 | 28000 |

TABLE 1-continued

| Experimental Ex. No. | Polymerization solvent | Boiling point (°C.) | Appearance after polymerization | Appearance after keeping at 0° C. | Foaming property on diluting with n-decane (cm) | Water-repelling property C[1] | Water-repelling property N[2] | Oil-repelling property C | Oil-repelling property N | MW or polymer (Number average) |
|---|---|---|---|---|---|---|---|---|---|---|
| 2-4 | Dichlorofluoroethan/n-Decane (1/1) | Dichlorofluoroethane = 32 n-Decane = 174 | Homogeneous and clear | Homogeneous and clear | 5 | 100 | 100 | 6 | 6 | 32000 |
| 2-5 | 1,1-Dichloro-2,2,3,3,3-pentafluoropropane | 51 | Homogeneous and clear | Homogeneous and clear | 3 | 90 | 90 | 4 | 4 | 27000 |
| 2-6 | 1,1,2,2,3,3,4,4-Octafluorobutane | 44 | Homogeneous and clear | Homogeneous and clear | 2 | 100 | 100 | 5 | 6 | 29000 |
| 2-7 | n-Hexane | 69 | Partial precipitation of polymer | Coagulation of whole liquid | 15 | 70 | 80 | 3 | 4 | 27000 |
| 2-8 | n-Hexane | 69 | Homogeneous and clear | Homogeneous and clear | 12 | 50 | 50 | 0 | 0 | 26000 |
| 2-9 | Toluene | 111 | Partial precipitation of polymer | Precipitation and separation of polymer | 13 | 90 | 100 | 5 | 5 | 26000 |
| 2-10 | Toluene | 111 | Homogeneous and clear | Coagulation of whole liquid | 15 | 80 | 90 | 3 | 4 | 29000 |
| 2-11 | Trichlorotrifluoroethane | 48 | Homogeneous and clear | Homogeneous and clear | 3 | 100 | 100 | 5 | 6 | 29000 |

As is clear from Table 1, as to Experimental Examples 2-1 to 2-6 both the water-repelling property and oil-repelling property are excellent, and the foaming is little, and the storage stability is also excellent. As to Experimental Examples 2-7, 2-9 and 2-10, the storage stability is worse, and as to Experimental Example 2-8 though the storage stability is good, all of the water-repelling property, oil-repelling property and foaming property are worse. As to Experimental Example 2-11, the water-repelling property, oil-repelling property, foaming property and storage stability are excellent, but the used solvent is not legally usable.

INDUSTRIAL APPLICABILITY

The water- and oil-repelling agent composition of the present invention is excellent in storage stability and water- and oil-repelling property, and has a low foaming property, and thus troubles caused when applying to a dry cleaning machine can be avoided. Further since solvents which has been decided not to be produced such as trichlorotrifluoroethane and 1,1,1-trichloroethane are not used, the problem to degarde the ozone layer cannot be occured.

The particular fluorine-containing polymerization solvent used in the present invention can dissolve a polymer well and has a proper boiling point, and thus is easily handled.

We claim:

1. A process for preparing a water- and oil-repelling agent composition, which comprises solution-polymerizing a polymerizable monomer component which contains at least a monomer having a polyfluoroalkyl group in a polymerizing solvent which contains at least one compound (A) selected from the group consisting of 1,1-dichloro-1-fluoroethane,
1,1-dichloro-2,2,3,3,3-pentafluoropropane,
1,3-dichloro-1,1,2,2,3-pentafluoropropane,
1,1,1,2,2-pentafluorobutane,
1,1,1,2,3,3,4-heptafluorobutane,
1,1,1,2,3,4,4-heptafluorobutane,
1,1,2,2,3,4,4-heptafluorobutane,
1,2,3,3,4,4-hexafluorocyclobutane,
2-trifluoromethyl-1,1,1,2,4,4-hexafluoropentane,
1,1,1,2,2,5,5,5-octafluoropentane,
2-trifluoromethyl-1,1,1,2,3,3,4,4-octafluoropentane,
2-trifluoromethyl-1,1,1,4,4,5,5,5-octafluorohexane,
2-trifluoromethyl-1,1,1,2,3,4,5,5,5,-nonafluorohexane and
2-trifluoromethyl-1,1,1,3,3,4,4,5,5,5-decafluorohexane,
said solvent containing the compound (A) in an amount of at least 5% by weight.

2. The process for preparing the water- and oil-repelling agent composition of claim 1, wherein the compound (A) is at least one member selected from the group consisting of 1,1-dichloro-1-fluoroethane and 1,2,3,3,4,4-hexafluorocyclobutane.

3. The process for preparing the water- and oil-repelling agent composition of claim 1, wherein the polymerization solvent contains 1,1-dichloro-1-fluoroethane in an amount of at least 10% by weight.

4. The process for preparing the water- and oil-repelling agent composition of claim 1, wherein the compound (A) contains both a fluorine atom and a chlorine atom and is other than trichlorotrifluoroethane and 1,1,1-trifluoroethane.

5. The process for preparing the water- and oil-repelling agent composition of claim 1, wherein the compound (A) is at least one member selected from the group consisting of 1,1-dichloro-1-fluoroethane,
1,1-dichloro-2,2,3,3,3-pentafluoropropane,
1,3-dichloro-1,1,2,2,3-pentafluoropropane,
1,1,1,2,2-pentafluorobutane,
1,1,1,2,3,3,4-heptafluorobutane,
1,1,1,2,3,4,4-heptafluorobutane,
1,1,2,2,3,4,4-heptafluorobutane,
1,2,3,3,4,4-hexafluorocyclobutane,
2-trifluoromethyl-1,1,1,2,4,4-hexafluoropentane, 2-trifluoromethyl-1,1,1,2,3,3,4,4-octafluoropentane, 2-trifluoromethyl-1,1,1,4,4,5,5,5-octafluorohexane, 2-trifluoromethyl-1,1,1,2,3,4,5,5,5,-nonafluorohexane, and 2-trifluoromethyl-1,1,1,3,3,4,4,5,5,5-decafluorohexane.

6. A water- and oil-repelling agent composition, which is obtained by solution-polymerizing a polymerizable monomer component which contains at least a monomer having a polyfluoroalkyl group in a polymerizing solvent which contains at least one compound (A) selected from the group consisting of 1,1-dichloro-1-fluoroethane, 1,1-dichloro-2,2,3,3,3-pentafluoropropane, 1,3-dichloro-1,1,2,2,3-pentafluoropropane, 1,1,1,2,2-pentafluorobutane, 1,1,1,2,3,3,4-heptafluorobutane, 1,1,1,2,3,4,4-heptafluorobutane, 1,1,2,2,3,4,4-heptafluorobutane, 1,2,3,3,4,4-hexafluorocyclobutane, 2-trifluoromethyl-1,1,1,2,4,4-hexafluoropentane, 1,1,1,2,2,5,5,5-octafluoropentane, 2-trifluoromethyl-1,1,1,2,3,3,4,4-octafluoropentane, 2-trifluoromethyl-1,1,1,4,4,5,5,5-octafluorohexane, 2-trifluoromethyl-1,1,1,2,3,4,5,5,5,-nonafluorohexane, and 2-trifluoromethyl-1,1,1,3,3,4,4,5,5,5-decafluorohexane, said solvent containing the compound (A) in an amount of at least 5% by weight.

7. The water- and oil-repelling agent composition of claim 6, wherein the compound (A) is at least one member selected from the group consisting of 1,1-dichloro-1-fluoroethane and 1,2,3,3,4,4-hexafluorocyclobutane.

8. The water- and oil-repelling agent composition of claim 6, wherein the polymerization solvent contains 1,1-dichloro-1-fluoroethane in an amount of at least 10% by weight.

9. The water- and oil-repelling agent composition of claim 6, wherein the compound (A) contains both a fluorine atom and a chlorine atom and is other than trichlorotrifluoroethane and 1,1,1-trifluoroethane.

10. The water- and oil-repelling agent composition of claim 6, wherein the compound (A) is at least one member selected from the group consisting of 1,1-dichloro-1-fluoroethane, 1,1-dichloro-2,2,3,3,3-pentafluoropropane, 1,3-dichloro-1,1,2,2,3-pentafluoropropane, 1,1,1,2,2-pentafluorobutane, 1,1,1,2,3,3,4-heptafluorobutane, 1,1,1,2,3,4,4-heptafluorobutane, 1,1,2,2,3,4,4-heptafluorobutane, 1,2,3,3,4,4-hexafluorocyclobutane, 2-trifluoromethyl-1,1,1,2,4,4-hexafluoropentane, 2-trifluoromethyl-1,1,1,2,3,3,4,4-octafluoropentane, 2-trifluoromethyl-1,1,1,4,4,5,5,5-octafluorohexane, 2-trifluoromethyl-1,1,1,2,3,4,5,5,5,-nonafluorohexane, and 2-trifluoromethyl-1,1,1,3,3,4,4,5,5,5-decafluorohexane.

11. A water- and oil-repelling agent composition which is obtained by solution-polymerizing a polymerizable monomer component which contains at least a monomer havening a polyfluoroalkyl group in the absence of trichlorotrifluoroethane and/or 1,1,1-trifluoroethane but in the presence of a polymerizing solvent which contains at least one compound (A) with a boiling point of 0° to 150° C. selected from the group consisting of a hydrochlorofluorocarbon having 2 to 3 carbon atoms and a hydrofluorocarbon having 4 to 6 carbon atoms and 4 or more fluorine atoms, said solvent containing the compound (A) in an amount of at least 5% by weight.

12. The water- and oil-repelling agent composition of claim 11, where the monomer component is a mixture of a monomer having a polyfluoroalkyl group and a monomer free of polyfluoroalkyl group at a weight ratio of 20/80 to 100/0, and the monomer component is used in the amount of 0.5 to 50% by weight on the basis of the total weight of the monomer component and the polymerization solvent.

13. The water- and oil-repelling agent composition of claim 11, wherein the monomer having a polyfluoroalkyl group is a polyfluoroalkyl group-containing (meth)acrylic acid ester.

14. The process for preparing the water- and oil-repelling agent composition of claim 11, wherein the compound (A) contains both a fluorine atom and a chlorine atom.

15. A process for preparing a water- and oil-repelling agent composition, which comprises solution-polymerizing a polymerizable monomer component which contains at least a monomer havening a polyfluoroalkyl group in a polymerizing solvent which contains at least one compound (A) with a boiling point of 0° to 150° C. selected from the group consisting of a hydrochlorofluorocarbon having 2 to 3 carbon atoms and a hydrofluorocarbon having 4 to 6 carbon atoms and 4 or more fluorine atoms, said solvent containing the compound (A) in an amount of at least 5% by weight.

16. The process for preparing the water- and oil-repelling agent composition of claim 15, where the monomer component is a mixture of a monomer having a polyfluoroalkyl group and a monomer free of polyfluoroalkyl group at a weight of 20/80 to 100/0, and the monomer component is used in an amount of 0.5 to 50% by weight on the basis of the total weight of the monomer component and the polymerization solvent.

17. The process for preparing the water- and oil-repelling agent composition of claim 15, wherein the monomer having a polyfluoroalkyl group is a polyfluoroalkyl group-containing (meth)acrylic acid ester.

18. The process for preparing the water- and oil-repelling agent composition of claim 15, wherein the compound (A) contains both a fluorine atom and a chlorine atom and is other than trichlorotrifluoroethane and 1,1,1-trifluoroethane.

* * * * *